United States Patent [19]
McMahan

[11] 3,952,594
[45] Apr. 27, 1976

[54] TEMPERATURE REGISTERING FAUCET ATTACHMENT

[75] Inventor: W. Glenn McMahan, Broomfield, Colo.

[73] Assignee: The Raymond Lee Organization,. Inc., New York, N.Y. ; a part interest

[22] Filed: Feb. 11, 1975

[21] Appl. No.: 549,005

[52] U.S. Cl. ............................................. 73/349
[51] Int. Cl.² ................ G01K 13/02; G01K 1/08; G01K 1/14; G01K 5/48
[58] Field of Search ........................... 73/349, 343 R

[56] References Cited
UNITED STATES PATENTS

| | | | |
|---|---|---|---|
| 2,289,908 | 7/1942 | Gorton | 73/349 |
| 2,626,524 | 1/1953 | Harman | 73/349 X |
| 3,581,568 | 6/1971 | Pfefer | 73/343 R |

Primary Examiner—Richard C. Queisser
Assistant Examiner—Frederick Shoon
Attorney, Agent, or Firm—Howard I. Podell

[57] ABSTRACT

An attachment mountable on the end of the spout of a faucet fitted with means for indicating the temperature of the liquid flowing out of the spout. The device is of tubular shape and formed with a male thread for fastening into a female thread in a faucet spout. A bi-metal spring is mounted inside the tube, with the free end of the spring joined to an indicator mounted in a slot in the wall of the device and visible to an operator of the faucet to enable the operator to control the flow of liquid through the spout so as to provide a desired temperature of liquid.

1 Claim, 3 Drawing Figures

TEMPERATURE REGISTERING FAUCET ATTACHMENT

SUMMARY OF THE INVENTION

The invention is particularly suitable for use on the spout of sinks which are joined to both a hot water and a cold water supply source and valve.

BRIEF DESCRIPTION OF THE DRAWINGS

The objects and features of the invention may be understood with reference to the following detailed description of an illustrative embodiment of the invention, taken together with the accompanying drawings in which.

Figure 1:
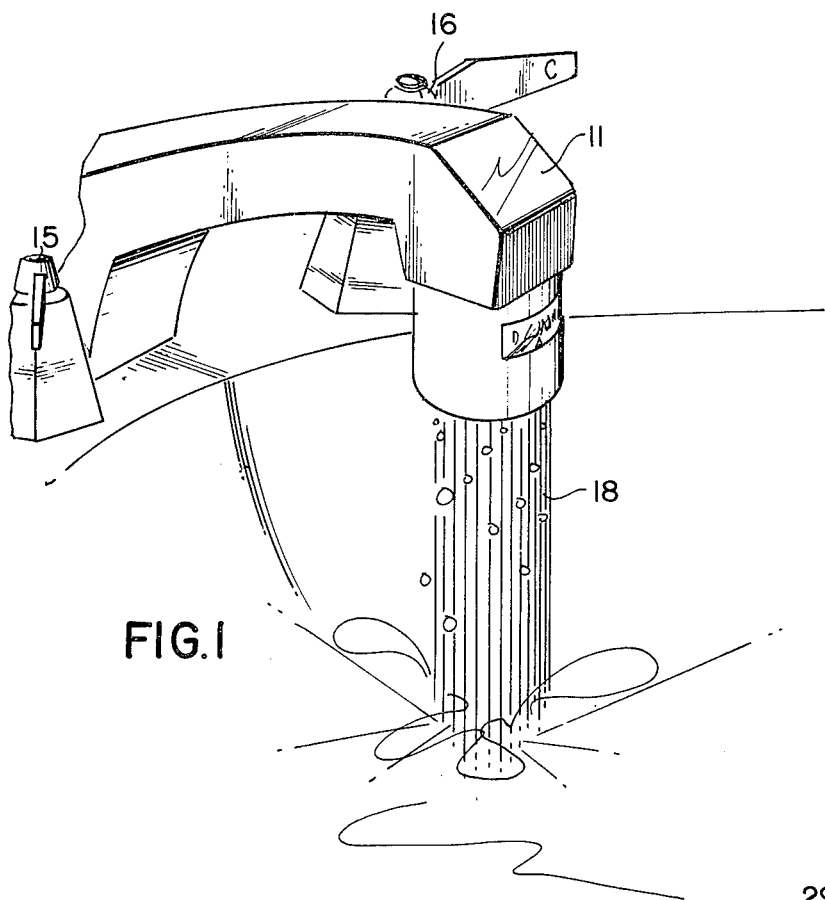
FIG. 1 is a perspective view of the invention in use.
Figure 3:
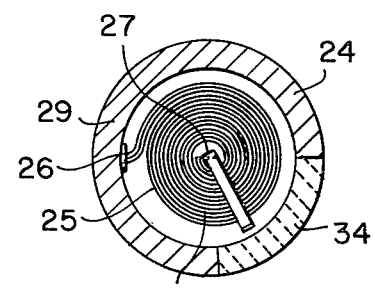
FIG. 3 is a sectional view of the device taken along line 3—3 of FIG. 2.
Figure 2:
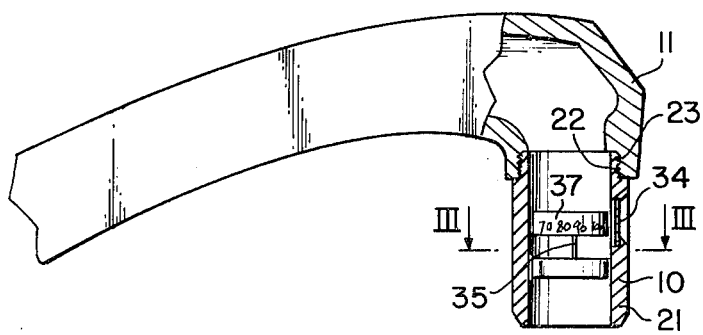
FIG. 2 is a sectional use of the invention.

DESCRIPTION OF THE PREFERRED EMBODIMENT:

Turning now descriptively to the drawings, in which similar reference characters denote similar elements throughout the several views, FIGS. 1-3 illustrate the temperature indicating spout device 10 which is threaded onto the end of a spout 11 of a sink, with the flow of water 18 through spout 11 controlled by hot water valve 15 and a cold water valve 16.

The device 10 is in the form of a tube 21 fitted with screw threads 22 at one end for engagement with mating screw threads 23 at the mouth of the spout 11.

A coil 25 of bi-metal wire strip is fastened inside the device 10 so as to be in contact with water 18 passing through the device, with the outer end 26 of the coil fixed to the inner wall 29 of the tube 21 and the inner end 27 of the coil fixed to an indicator pointer 35. The indicator pointer 35 is visible to the user through a transparent sectioon 34 of the tubing, with markings 37 of the transparent section indicating a temperature scale.

The bi-metal coil 25 rotates under a change of temperature to move the indicator 35 to the position to indicate the temperature of the water passing through the device on scale markings 37.

Alternately other forms of temperature indicators mounted in the wall 29 of tubing 21 may be employed.

Since obvious changes may be made in the specific embodiment of the invention described herein, such modifications being within the spirit and scope of the invention claimed, it is indicated that all matter contained herein is intended is intended as illustrative and not as limiting in scope.

Having thus described the invention, what I claim as new and desire to secure by Letters Patent of the United States is:

1. A gauge device adaptable for permanent attachment to the end of a spout of a sink which is fitted with means to indicate the temperature of water pouring out of said spout and through said device, in the form of
a tube open fitted at each end with a screw thread at one end for attachment to a mating screw thread at the end of the spout, with the interior of said tube fitted with a movable indicator needle responsive in position to the temperature of water passing through and out of the tube, together with a fixed transparent section of tube wall positioned so as to make the position of the indicator visible to the exterior of the device, said fixed section marked with a temperature scale.

* * * * *